United States Patent
Muratsubaki

(10) Patent No.: US 11,371,591 B2
(45) Date of Patent: Jun. 28, 2022

(54) TENSIONER LEVER

(71) Applicant: TSUBAKIMOTO CHAIN CO., Osaka (JP)

(72) Inventor: Kenji Muratsubaki, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 61 days.

(21) Appl. No.: 17/036,285

(22) Filed: Sep. 29, 2020

(65) Prior Publication Data

US 2021/0131531 A1    May 6, 2021

(30) Foreign Application Priority Data

Nov. 6, 2019  (JP) .............................. JP2019-201200

(51) Int. Cl.
*F16H 7/08* (2006.01)
*F16H 7/06* (2006.01)

(52) U.S. Cl.
CPC ................. *F16H 7/08* (2013.01); *F16H 7/06* (2013.01); *F16H 2007/081* (2013.01); *F16H 2007/0872* (2013.01); *F16H 2007/0893* (2013.01)

(58) Field of Classification Search
CPC ................. F16H 7/08; F16H 2007/081; F16H 2007/0863; F16H 2007/0872; F16H 2007/0876; F16H 2007/0878; F16H 2007/0893; F16H 7/18; F16H 2007/185; F16H 2007/0846; F16H 7/06

(Continued)

(56) References Cited

U.S. PATENT DOCUMENTS 3,148,555 A  *  9/1964  Peras ........................ F16H 7/08
                                                           474/111
4,976,659 A  *  12/1990  Hans ...................... F16H 7/0834
                                                           474/111
(Continued)

FOREIGN PATENT DOCUMENTS

DE    102014211517 A1  *  12/2015  ............. F16H 57/01
JP    2000-274501 A        10/2000
(Continued)

OTHER PUBLICATIONS

JP2012-036996A Translation; Suzuki et al; Tensioner Lever for A Chain; Published: Feb. 23, 2012; Published By: Espacenet (Year: 2012).*

*Primary Examiner* — Michael R Mansen
*Assistant Examiner* — Raveen J Dias
(74) *Attorney, Agent, or Firm* — WHDA, LLP

(57) ABSTRACT

An object of the present invention is to provide a tensioner lever capable of consistently exerting appropriate reaction force to various tension fluctuations in conjunction with varying chain behavior, and reducing vibration and noise when the chain runs. The tensioner lever of the present invention includes a torsion coil spring having a pressing arm in which a distal end portion abuts on a lever body to form a first load point, and a support arm in which a distal end portion abuts on a support part provided to an attachment surface to form a first support point. The tensioner lever further includes a spring load adaption structure configured to form one or both of a second loading point and a second support point when a certain level or more of load is received from the chain.

4 Claims, 4 Drawing Sheets

(58) Field of Classification Search
USPC .......................................................... 474/111
See application file for complete search history.

(56) References Cited

U.S. PATENT DOCUMENTS

| | | | |
|---|---|---|---|
| 6,428,435 B1 | 8/2002 | Kumakura et al. | |
| 7,540,817 B2 * | 6/2009 | Hashimoto | F16H 7/0848 |
| | | | 192/41 S |
| 2009/0111629 A1 | 4/2009 | Kobara et al. | |
| 2016/0252166 A1 * | 9/2016 | Noro | F16H 7/08 |
| | | | 474/111 |
| 2017/0184183 A1 * | 6/2017 | Noro | F16H 7/08 |
| 2021/0156456 A1 * | 5/2021 | Watanabe | F16H 7/08 |
| 2021/0262552 A1 * | 8/2021 | Seki | F16H 7/08 |
| 2021/0356022 A1 * | 11/2021 | Muratsubaki | F16H 7/08 |

FOREIGN PATENT DOCUMENTS

| | | | | |
|---|---|---|---|---|
| JP | 2009-108909 A | | 5/2009 | |
| JP | 2012-36996 A | | 2/2012 | |
| WO | WO-2014044421 A | * | 3/2014 | ............... F16H 7/08 |
| WO | WO-2015115381 A1 | * | 8/2015 | ............... F16H 7/08 |
| WO | WO-2019061464 A1 | * | 4/2019 | ............... F16H 7/08 |
| WO | WO-2020100568 A1 | * | 5/2020 | ............... F16H 7/08 |

\* cited by examiner

TENSIONER LEVER

BACKGROUND OF THE INVENTION

1. Field of the Invention

The present invention relates to a tensioner lever that slidably guides a running chain, and more particularly to a chain tensioner lever that slidably guides a chain by pressing a shoe surface of a lever body toward the chain by elastic force of a torsion coil spring.

2. Description of the Related Art

As a tensioner lever that removes slackness in a chain and prevents vibration of a running chain in a chain transmission for an auxiliary machine or the like of a car engine, there is a known tensioner lever, which is pivotably attached to an attachment surface of an engine block or the like, and includes a lever body having a shoe surface that slidably guides the chain and a torsion coil spring interposed between the lever body and the attachment surface to press the shoe surface toward the chain (see, for example, Japanese Patent Application Laid-open Nos. 2000-274501, 2009-108909, and 2012-36996).

Such a tensioner lever is attached to an attachment surface such that a helical part of the torsion coil spring is loosely fitted around an outer circumferential surface of a boss part formed to protrude from a base part of the lever body toward the attachment surface, a pressing arm extending from one end of the helical part contacts the lever body, and that a distal end portion of a support arm extending from the other end of the helical part is inserted in a spring retention hole formed in the attachment surface.

In the tensioner lever like this, receiving load from the chain, the torsion coil spring is twisted, whereby a reaction force in accordance with the twisted amount (angular change of the pressing arm) is obtained.

SUMMARY OF THE INVENTION

However, following problem are evident in an existing tensioner lever: since a distal end portion of the support arm is fixed so that the load from the chain is received by the distal end of the pressing arm, and since the pressing arm has a fixed length, there is a limit to the maximum load capacity of the torsion coil spring. When subjected to an excessive load, the torsion coil spring undergoes a large elastic deformation, which deteriorates the capability of following sudden changes in chain behavior. In such a case it is difficult to suppress changes in chain behavior such as when the chain bounces largely at the start of the engine, or when the chain undergoes resonance in a high frequency range, because the reaction force could not be exerted correctly.

The present invention solves this problem and it is an object of the invention to provide a tensioner lever capable of consistently exerting appropriate reaction force to various fluctuations of tension in conjunction with varying chain behavior, and reducing vibration and noise when the chain runs.

The present invention solves the above problem by providing a tensioner lever including: a lever body having a shoe surface that slidably guides a chain and rotatably supported on a pivot shaft provided upright on an attachment surface; and a torsion coil spring interposed between the lever body and the attachment surface to press the shoe surface toward the chain, the torsion coil spring including a helical part loosely fitted to a cylindrical boss part provided to the lever body, a pressing arm extending from one end of the helical part and having as a first loading point a distal end portion contacting the lever body, and a support arm extending from another end of the helical part and having as a first support point a distal end portion contacting and being supported by a support part provided to the attachment surface.

The tensioner lever further includes a spring load adaption structure configured, when a certain level or more of load is received from the chain, to form one or both of a second loading point where the pressing arm contacts the lever body in a position different from the first loading point, and a second support point where the support arm contacts the support part in a position different from the first support point.

With the tensioner lever set forth in claim 1, one or both of a second loading point and a second support point are formed when a certain level or more of load is received from the chain so that the load from the chain is divided, and therefore the spring load of the torsion coil spring can be increased. When the load received from the chain is small, the load is received only at the first loading point, and the chain will not be pressed with more reaction force than necessary. Correct reaction force can thus be exerted consistently, so that chain bouncing at the start of the engine can be prevented.

Dividing the load from the chain reduces the twisting amount of the torsion coil spring, which enables the spring to exert correct reaction force in response to tension fluctuations that accompany sudden changes in chain behavior.

Forming one or both of the second loading point and the second support point changes the normal frequency (normal mode frequency) of the chain, which helps to attenuate resonance in the chain in the event that the chain undergoes resonance in a high frequency range.

According to the configuration set forth in claim 2, a sudden change in spring load of the torsion coil spring that may accompany the contact between the pressing arm and the abutment part forming wall can be prevented, so that correct reaction force can be exerted even more reliably.

The configuration set forth in claim 3 prevents deterioration of the capability of following changes in chain behavior, which may be caused if the reaction force of the torsion coil spring becomes too small.

According to the configuration set forth in claim 4, the same effects as when the spring load adaption structure is configured to form a second loading point can be achieved. Moreover, it is not necessary to provide the spring load adaption structure to the lever body, so that the assembling of the torsion coil spring to the lever body will not be hindered. Moreover, if the spring load adaption structure is configured to form a second loading point and a second support point, the capability of following changes in chain behavior can be readily improved.

DESCRIPTION OF THE PREFERRED EMBODIMENTS

A tensioner lever that is one embodiment of the present invention will be hereinafter described with reference to the drawings.

Figure 1:
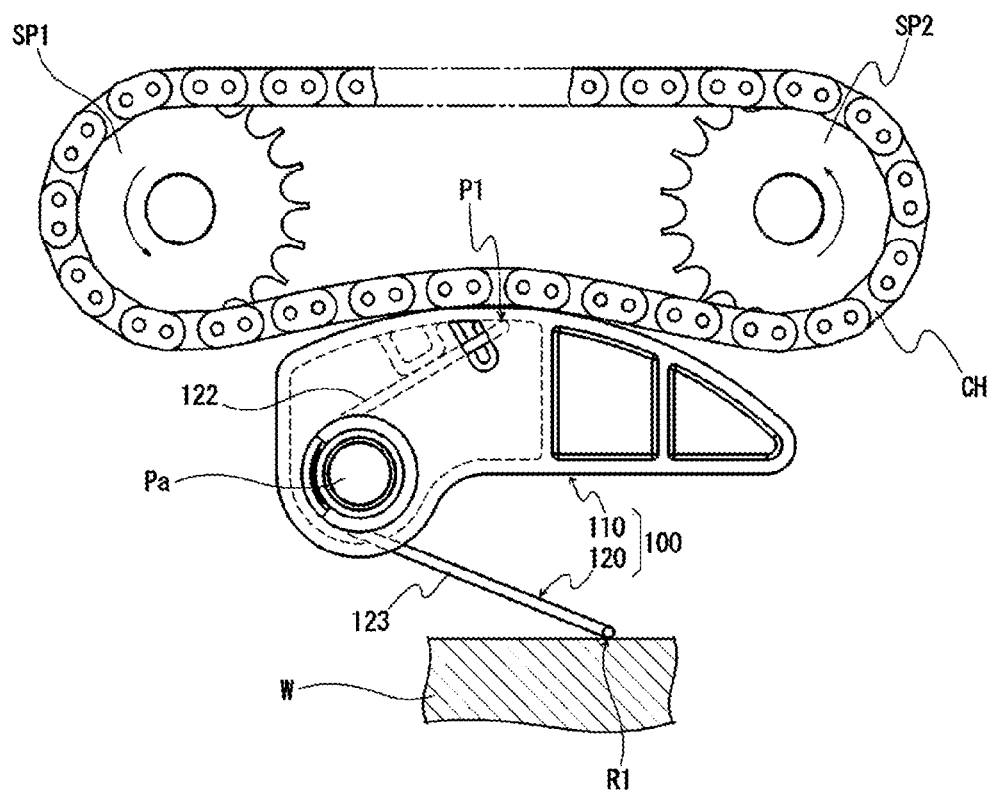
FIG. 1 is a diagram illustrating one example of a manner of use of a tensioner lever that is one embodiment of the present invention.

The tensioner lever 100, as illustrated in FIG. 1, is pivotably mounted on a pivot shaft Pa protruding from an attachment surface (not shown) of an engine block (not shown) or the like to slidably guide a chain CH running between a drive-side sprocket SP1 attached to a crankshaft and a driven-side sprocket SP2 attached to a shaft of an auxiliary machine to keep an appropriate chain tension.

The tensioner lever 100 includes a lever body 110 made of a synthetic resin or the like, and a torsion coil spring 120 made of metal or the like and interposed between the lever body 110 and the attachment surface.

Figure 2:
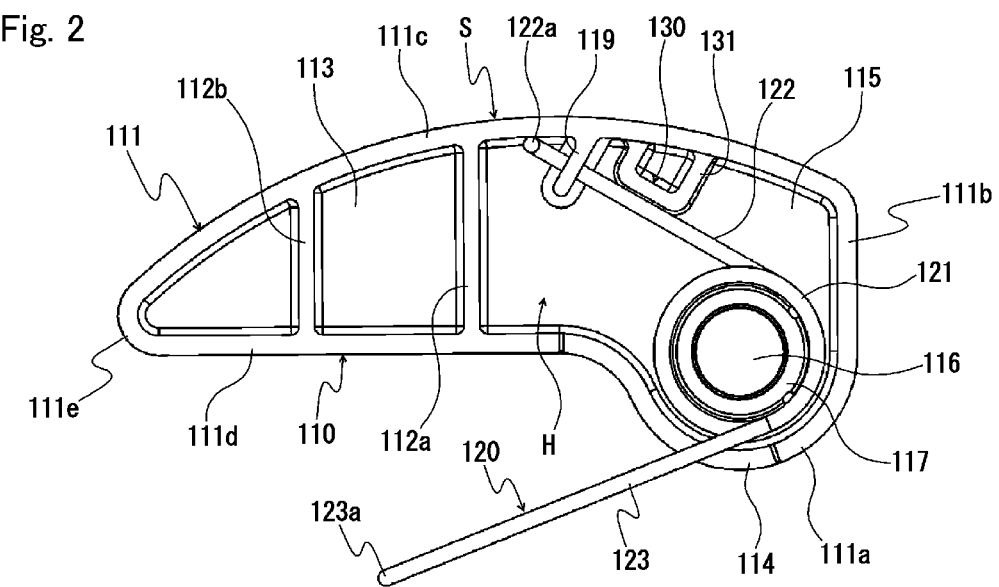
FIG. 2 is a side view on the back side illustrating the configuration of the tensioner lever.

The lever body 110 has a lever circumferential wall 111 formed substantially in a comma-like shape in side view, as illustrated in FIG. 2.

Figure 3:
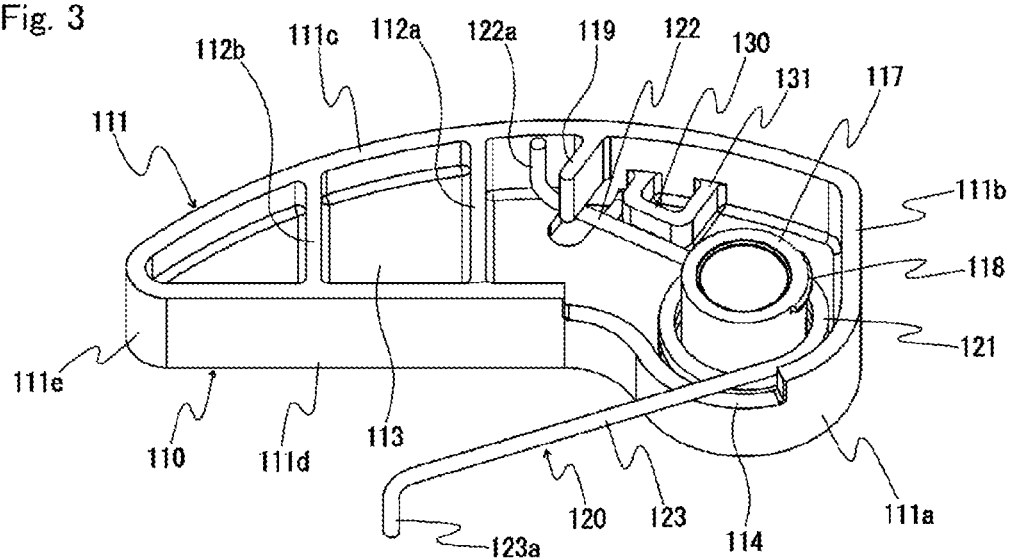
FIG. 3 is a perspective view on the back side illustrating the configuration of the tensioner lever.

The lever circumferential wall 111 includes, as also illustrated in FIG. 3, a circular arc circumferential wall part 111a having a shape conforming to the circumference of a concentric circle having the same center as the pivot shaft Pa, a substantially planar circumferential wall part on one side 111b continuous with one end of the circular arc circumferential wall part 111a and extending toward the chain CH, a chain-side circumferential wall part 111c with one end smoothly continuing from the other end of the circumferential wall part on one side 111b, and having a shape conforming to a circular arc convex toward the chain CH, a substantially planar non-chain-side circumferential wall part 111d with one end smoothly continuing from the other end of the circular arc circumferential wall part 111a, and extending on the opposite side of the chain-side circumferential wall part 111c, and a circumferential wall part on the other side 111e in a circular arc shape smoothly continuing from the other ends of each of the chain-side circumferential wall part 111c and the non-chain-side circumferential wall part 111d. An outer surface of the chain-side circumferential wall part 111c facing the chain CH is configured as the shoe surface S that slidably guides the chain CH.

The space surrounded by the lever circumferential wall 111 is partitioned to two cavities in the longitudinal direction by a reinforcing rib part 112a provided between the chain-side circumferential wall part 111c and the non-chain-side circumferential wall part 111d. One of the cavities positioned on one side forms a torsion spring accommodating part H. The cavity positioned on the other side is partitioned in the axial direction (in which the pivot shaft Pa extends) by a partition wall part 113 and each part of the divided cavity is provided with a reinforcing rib part 112b between the chain-side circumferential wall part 111c and the non-chain-side circumferential wall part 111d.

In a section of the lever circumferential wall 111 which defines the torsion spring accommodating part H, a lever side wall part 115 that covers the torsion spring accommodating part H is formed continuously from an end face on the opposite side from the attachment surface.

The lever side wall part 115 is formed with a shaft hole 116 in which the pivot shaft Pa is inserted. A cylindrical boss part 117 is integrally formed to the lever side wall part 115 such as to protrude from the circumferential edge of the shaft hole 116 toward the attachment surface. With the pivot shaft Pa being inserted into the boss part 117, the lever body 110 is pivotably (rotatably) supported on the attachment surface.

The end face of the boss part 117 on the side facing the attachment surface is formed to protrude slightly more toward the attachment surface than the lever circumferential wall 111, which prevents other parts than this end face of the boss part 117 on the side facing the attachment surface from contacting the attachment surface, so that smooth pivoting (rotation) of the lever body 110 around the pivot shaft Pa is ensured.

A restricting protrusion 118 is formed on an outer circumferential surface of the boss part at the end on the side facing the attachment surface to restrict the torsion coil spring 120 from moving toward the attachment surface. This way, in a state before the tensioner lever 100 is attached to the attachment surface, the torsion coil spring 120 is prevented from coming off of the lever body 110, and also, in a state where the tensioner lever 100 is attached to the attachment surface, the torsion coil spring 120 is prevented from interfering with the attachment surface.

The torsion coil spring 120 includes a helical part 121, a pressing arm 122 extending from one end of the helical part 121, and a support arm 123 extending from the other end of the helical part 121. The pressing arm 122 has a distal end portion 122a bent toward the attachment surface, while the support arm 123 has a distal end portion 123a bent in the opposite direction from the attachment surface.

The torsion coil spring 120 is set in the lever body 110 with the helical part 121 loosely fitted around the outer circumferential surface of the boss part 117. The distal end portion 122a of the pressing arm 122 forms a first loading point P1 by being abutted on an inner surface of the chain-side circumferential wall part 111c, while the support arm 123 extends out of the lever body 110 through a cut-out portion 114 provided to the circular arc circumferential wall part 111a, with the distal end portion 123a thereof forming a first support point R1 by being abutted to a support part W provided to the attachment surface (see FIG. 1).

The distal end portion of the pressing arm 122 is stopped by a spring lock rib 119 protruded from the inner surface of the chain-side circumferential wall part 111c, so that a correct contact state of the distal end portion 122a of the pressing arm 122 on the inner surface of the chain-side circumferential wall part 111c is secured.

Accordingly, as illustrated in FIG. 1, in a state in which the tensioner lever 100 is attached to the attachment surface, the resilient force of the torsion coil spring 120 exerts a torque on the lever body 110 around the pivot shaft Pa toward the chain CH so that the lever body presses the chain CH via the shoe surface S.

Furthermore, the tensioner lever 100 according to this embodiment includes a spring load adaption structure 130 configured to form a second loading point where the pressing arm 122 contacts the lever body 110 in a position different from the first loading point P1 when the tensioner lever receives a certain level or more of load from the chain CH.

The spring load adaption structure 130 includes an abutment part forming wall 131 formed to protrude from the inner surface of the chain-side circumferential wall part 111*c*.

Figure 4:
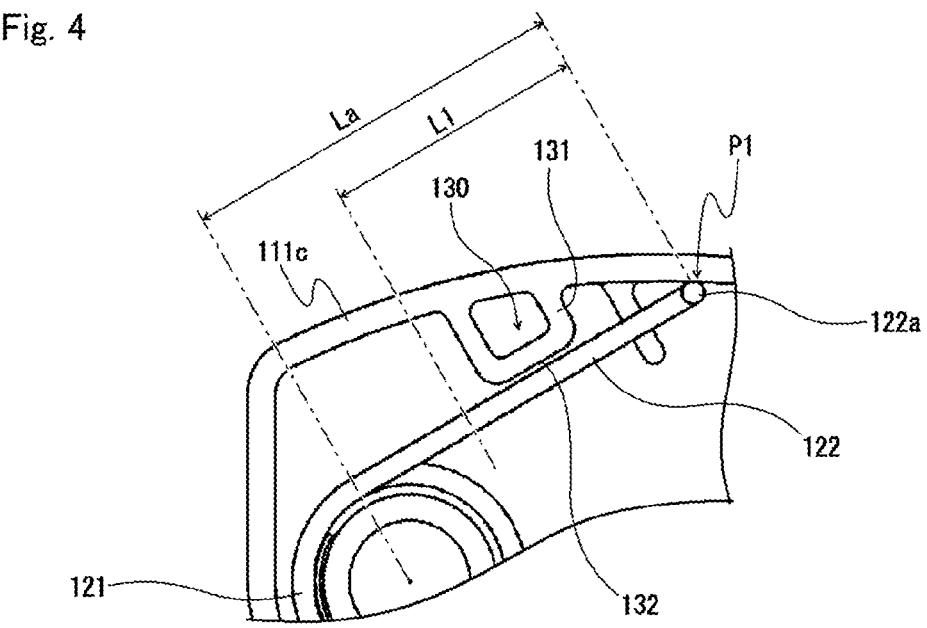
FIG. 4 is a schematic diagram illustrating a state of a torsion coil spring in a state in which the tensioner lever is attached to an attachment surface.

As illustrated in FIG. 4, the abutment part forming wall 131 includes a flat inner wall surface 132 facing the pressing arm 122, and in a state in which the tensioner lever 100 is attached to the attachment surface, the inner wall surface 132 is spaced apart from the circumferential surface of the pressing arm 122.

The spring load adaption structure 130 is configured such that, when the pressing arm 122 contacts the abutment part forming wall 131, the area of contact between the pressing arm 122 and the abutment part forming wall 131 gradually increases.

Figure 5:
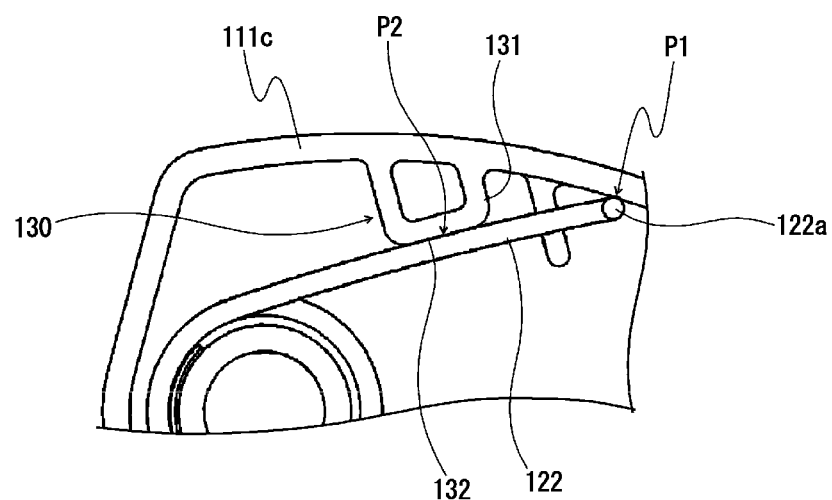
FIG. 5 is a schematic diagram illustrating a state of a torsion coil spring when a high load is applied.

In this embodiment, when more than a level or more of load is received from the chain CH, the pressing arm 122 warps such as to be convex toward the circumferential wall part 111*c* as illustrated in FIG. 5, so that the circumferential surface of the pressing arm 122 gradually comes into contact with the inner wall surface 132 of the abutment part forming wall 131. This helps to prevent a sudden change in spring load of the torsion coil spring 120 that may accompany the contact between the pressing arm 122 and the abutment part forming wall 131, which allows for even more reliable exertion of correct reaction force.

The abutment part forming wall 131 is formed such that the second loading point P2 will be located within a region L1 of a length that is ⅔ of the length La of the pressing arm 122 from the first loading point P1, as illustrated in FIG. 4. This allows for setting of an appropriate level of spring load of the torsion coil spring 120, which allows for even more reliable exertion of correct reaction force. If the abutment part forming wall 131 is formed such that the second loading point P2 will be located outside this region L1, the spring load of the torsion coil spring 120 may become excessive, and correct reaction force may not be exerted.

While one embodiment of the present invention has been described in detail, the present invention is not limited to the embodiment described above and may be carried out with various design changes without departing from the scope of the present invention set forth in the claims.

For example, while the spring load adaption structure has been depicted as being formed by an abutment part forming wall on the chain-side circumferential wall part in the embodiment described above, a spring load adaption structure may be configured to make contact with the pressing arm to form a second loading point when a high load is applied by changing the shape of the pressing arm of the torsion coil spring as suited, for example. Specifically, for example, a torsion coil spring having a pressing arm, for example, extending in a circular arc shape curved toward the chain-side circumferential wall part may be used to form a spring load adaption structure.

Moreover, while the spring load adaption structure has been depicted as being formed such that a second loading point is formed when a high load is applied in the embodiment described above, the spring load adaption structure may be configured such that a second support point is formed when a high load is applied, or, such that a second loading point and a second support point are formed when a high load is applied.

Figure 6:
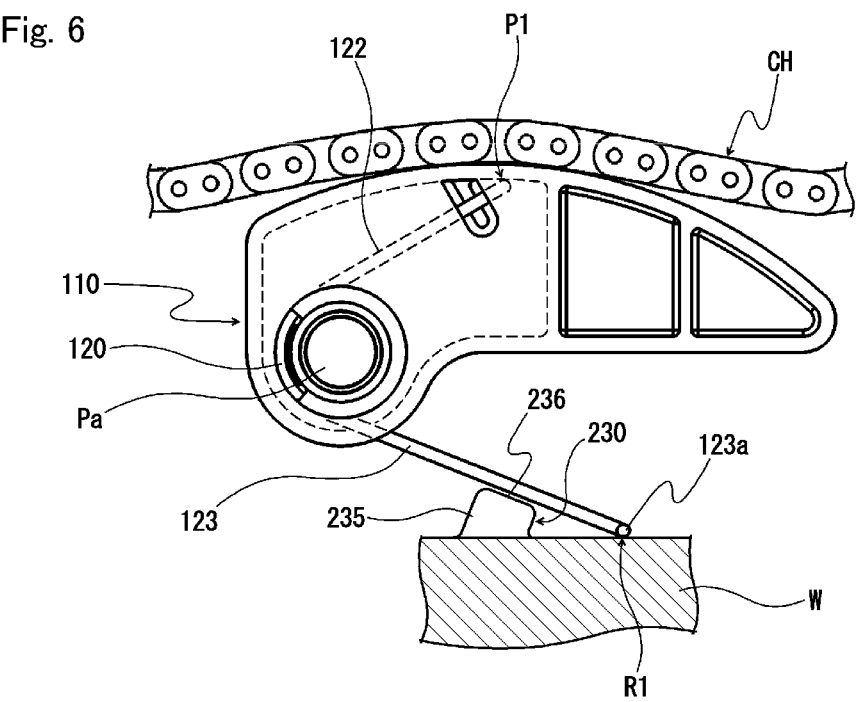
FIG. 6 is a diagram illustrating one example of a manner of use of a tensioner lever that is another embodiment of the present invention.
Figure 7:
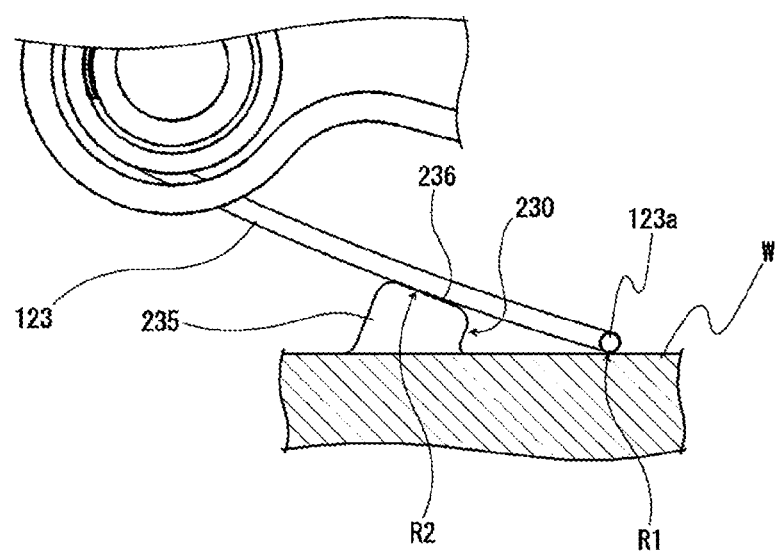
FIG. 7 is a schematic diagram illustrating a state of a torsion coil spring in the tensioner lever illustrated in FIG. 6 when a high load is applied.

When the spring load adaption structure 230 is to be configured such that a second support point R2 will be formed, an abutment part forming wall 235 on the abutment surface side may be provided to a support part W of the abutment surface, as illustrated in FIG. 6. The spring load adaption structure 230 is configured such that, when the support arm 123 contacts the abutment part forming wall 235 on the abutment surface side, the area of contact between the support arm 123 and the abutment part forming wall 235 on the abutment surface side gradually increases. In this embodiment, the abutment part forming wall 235 on the abutment surface side has a flat inner wall surface 236, and when a high load is applied, the support arm 123 warps such as to be convex toward the support part W as illustrated in FIG. 7, so that the circumferential surface of the support arm 123 gradually comes into contact with the inner wall surface 236 of the abutment part forming wall 235 on the abutment surface side, thereby forming the second support point R2. The abutment part forming wall 235 on the abutment surface side is formed such that the second support point R2 will be located within a region of a length that is ⅔ of the length of the support arm 123 from the first support point R1.

In the case with configuring the spring load adaption structure 230 such that a second support point will be formed, too, the spring load adaption structure may be configured by using a torsion coil spring having a support arm extending in a circular arc shape curved toward the support wall part.

What is claimed is:

1. A tensioner lever comprising: a lever body having a shoe surface that slidably guides a chain and rotatably supported on a pivot shaft provided upright on an attachment surface; and a torsion coil spring interposed between the lever body and the attachment surface to press the shoe surface toward the chain, the torsion coil spring including a helical part loosely fitted to a cylindrical boss part provided to the lever body, a pressing arm extending from one end of the helical part to form a first loading point where a distal end portion of the pressing arm contacts the lever body, and a support arm extending from another end of the helical part to form a first support point where a distal end portion of the support arm contacts and is supported by a support part provided to the attachment surface, the tensioner lever further comprising a spring load adaption structure configured, when a certain level or more of load is received from the chain, to form one or both of a second loading point where the pressing arm contacts the lever body in a position different from the first loading point, and a second support point where the support arm contacts the support part in a position different from the first support point, wherein the second loading point is a position where a spring load is applied together with the first loading point, and the second support point is a position where the spring load is applied together with the first support point.

2. The tensioner lever according to claim 1, wherein the spring load adaption structure includes an abutment part forming wall configured to form the second loading point and protruded from an inner side face of a chain-side circumferential side wall that forms the shoe surface, the spring load adaption structure being configured such that, when the pressing arm contacts the abutment part forming wall, an area of contact between the pressing arm and the abutment part forming wall gradually increases.

3. The tensioner lever according to claim 1, wherein the spring load adaption structure includes an abutment part forming wall configured to form the second loading point and protruded from an inner side face of a chain-side circumferential side wall that forms the shoe surface, the abutment part forming wall being formed such that the second loading point is located at a region along the pressing arm, the region being within a length that is ⅔ of a length of the pressing arm from the first loading point.

4. The tensioner lever according to claim 1, wherein the spring load adaption structure includes an attachment-surface-side abutment part forming wall provided to the support part of the attachment surface and configured to form the second support point.

\* \* \* \* \*